United States Patent [19]

Kontz

[11] Patent Number: 4,724,029

[45] Date of Patent: Feb. 9, 1988

[54] METHOD AND APPARATUS FOR APPLYING A FLEXIBLE PLASTIC LABEL TO A ROUND CONTAINER

[75] Inventor: Robert F. Kontz, Toledo, Ohio

[73] Assignee: Owens-Illinois, Inc., Toledo, Ohio

[21] Appl. No.: 831,959

[22] Filed: Feb. 24, 1986

[51] Int. Cl.[4] ............ B32B 31/04

[52] U.S. Cl. ............ 156/256; 156/320; 156/322; 156/497; 156/499; 156/517; 156/521; 156/568; 156/578

[58] Field of Search ............ 156/256, 269, 517, 521, 156/567, 568, 571, 578, DIG. 21, DIG. 36, DIG. 51, 320, 321, 322, 497, 499

[56] References Cited

U.S. PATENT DOCUMENTS

| | | | |
|---|---|---|---|
| Re. 23,512 | 6/1952 | Von Hofe | 156/DIG. 36 |
| 2,449,298 | 9/1948 | Hoppe | 156/DIG. 36 |
| 2,489,837 | 11/1949 | Von Hofe | 156/DIG. 36 |
| 2,668,632 | 2/1954 | Zimpel | 156/DIG. 36 |
| 2,878,953 | 3/1959 | Mitchell | 156/571 |
| 3,235,433 | 2/1966 | Cuacho et al. | 156/229 |
| 3,455,768 | 7/1969 | Niemeyer | 156/568 |
| 3,524,788 | 8/1970 | Whitecar | 156/568 |
| 4,025,385 | 5/1977 | Wood | 156/568 |
| 4,097,325 | 6/1978 | Schnier | 156/215 |
| 4,323,416 | 4/1982 | Malthouse et al. | 156/521 |
| 4,406,721 | 9/1983 | Hoffmann | 156/86 |
| 4,574,020 | 3/1986 | Fosnaught | 156/80 |

FOREIGN PATENT DOCUMENTS

| | | | |
|---|---|---|---|
| 730798 | 6/1955 | United Kingdom | 156/568 |

*Primary Examiner*—Caleb Weston
*Attorney, Agent, or Firm*—H. G. Bruss

[57] ABSTRACT

A labeling machine for successively applying flexible plastic labels to round containers, such labeling machine incorporating equipment to sever labels from a web of indefinite length thereof, to apply a leading edge of each of such labels to the periphery of a rotating vacuum drum, heating the leading and trailing edges of each such label while on the rotating vacuum drum by directing warm air thereagainst to heat such leading and trailing edges to a temperature at which the material therein becomes self-adhesive, and bringing the heated leading edge of the label on the vacuum drum into contact with a container rolling along a curved surface at a label transfer station to cause the label to transfer to the container and to eventually wind itself around the rolling container, thereby causing the heated leading and trailing edges of the label to adhere to the container or, in the case of a label whose length exceeds the circumference of the container, to cause the trailing edge of the label to adhere to the overlapped leading edge thereof.

6 Claims, 3 Drawing Figures

METHOD AND APPARATUS FOR APPLYING A FLEXIBLE PLASTIC LABEL TO A ROUND CONTAINER

BACKGROUND OF THE INVENTION

1. Field of the Invention

This invention relates to equipment for applying double-ended flexible plastic labels to round containers, such as bottles and cans, on a high-speed production basis and without the use of a hot-melt, solvent or other separate adhesive, the labels being cut from a preprinted web of indefinite length of such labels by the labeling equipment itself.

2. Description of the Prior Art

U.S. Pat. No. 4,323,416 (Malthouse, et al) discloses equipment for applying double-ended labels from a web or strip of such labels to bottles in which there is provided an adhesive applicator to apply an adhesive substance to the label, after the label has been severed from the web or strip and before the label is applied to the bottle, to ennsure adhesion of the label to the bottle. Adhesive usually used in bottle labeling of this type is a hot-melt adhesive, and the use of such a hot-melt adhesive is messy and can be expensive because of the cost of the adhesive and the cost of equipment for storing it, handling it, and applying it. U.S. Pat. No. 4,406,721 (Hoffman) also discloses a system for applying double-ended labels from a web of a heat-shrinkable material of such labels to bottles or other containers, the system of Hoffman utilizing heat to cause the labels to shrink after they have been applied to the bottles. U.S. Pat. No. 3,235,433 (Cvacho et al.) describes a similar system in which a heat-activatable adhesive is heat-activated before the label is applied to the container.

U.S. Pat. No. 4,574,020, in the name of Harold R. Fosnaught, which application is assigned to the assignee of this application, and the disclosure of which is hereby incorporated by reference herein, now U.S. Pat. No. 4,574,020, recognized the objection to the use of a hot-melt adhesive in a container labeling system, especially in regard to a container labeling system that utilizes labels formed from thermoplastic materials. The invention described in the aforesaid U.S. patent application Ser. No. 555,758 eliminated the need for an applicator to apply a hot-melt adhesive to the label being applied to the bottle by utilizing an applicator to apply a solvent for the thermoplastic material in the label, such as methylene chloride as a solvent for labels formed from polystyrene, thereby eliminating some of the disadvantages inherent in utilizing a hot-melt adhesive in a bottle labeling system. However, strict environmental and occupational and health standards apply to the handling and use of solvents such as methylene chloride, and strict precautions must be followed in using such solvents in a label applicating system to comply with applicable regulatory standards. To ensure compliance with such standards, therefore, it is necessary to make expensive investments in applicating equipment and in the operation thereof.

U.S. Pat. No. 4,097,325 (Schnier) discloses a label applicating machine in which pre-cut plastic labels are transferred, in sequence, from a supply thereof in a magazine in a container labeling station, the transfer mechanism having heated, label contacting fingers to heat each label to a self-adhesive state to permit its application to a container without the need for a separate adhesive. However, this reference does not disclose the heating of plastic labels being severed from a web of such labels by the labeling equipment itself, and it does not disclose the structure for accomplishing this result.

SUMMARY OF THE INVENTION

According to the present invention there is provided a method and apparatus for successively applying flexible thermoplastic labels to the cylindrical body portions of round containers, such as bottles or cans. The apparatus of this invention, which is otherwise similar to that disclosed in the aforesaid U.S. Pat. No. 4,574,020 of Harold R. Fosnaught, incorporates a heated air distributor to heat selected portions of each label immediately prior to its application to a bottle. The selected portion of the labels that are heated are heated to a temperature sufficiently high to cause them to become tacky or self-adhesive so that such selected portions are capable of adhering directly to the bottle, or to other portions of such label in the case of a label which is applied with overlapping ends, thereby eliminating the need for a solvent adhesive applicator of the type disclosed in the aforesaid U.S. Pat. No. 4,574,020, and without, thereby, requiring the use of a hot-melt or other separate adhesive applicator of the type disclosed in the aforesaid U.S. Pat. No. 4,323,416 (Malthouse, et al). In the apparatus of the present invention the hot air, or other heated fluid, is directed against the preselected portions of each label through a slot in a rotatable cylindrical hot air distributor, the rotatable cylindrical hot air distributor being sealingly baffled by a C-shaped baffle during a major portion of its rotation, when the slot is not aligned with one or another of the preselected portions of the label to be heated, to divert the heated air away from the label when the preselected portions are not aligned with the slot.

Accordingly, it is an object of the present invention to provide an apparatus and method for quickly and efficiently sequentially applying plastic labels to containers without using a hot-melt adhesive or a solvent, thereby eliminating the various drawbacks attendant to the use of either of such adhesives.

More particularly, it is an object of the present invention to provide an apparatus and method for quickly and efficiently sequentially applying plastic labels to containers in a manner which does not pose health and safety risks to the personnel who are situated near the location of the application of the labels to the containers and in an environmentally unobjectionable manner.

For further understanding of the present invention and the objects thereof, attention is directed to the drawing and the following description thereof, to the detailed description of the preferred embodiment and the appended claims.

BRIEF DESCRIPITION OF THE DRAWINGS

DETAILED DESCRIPTION OF THE PREFERRED EMBODIMENT

Figure 1:
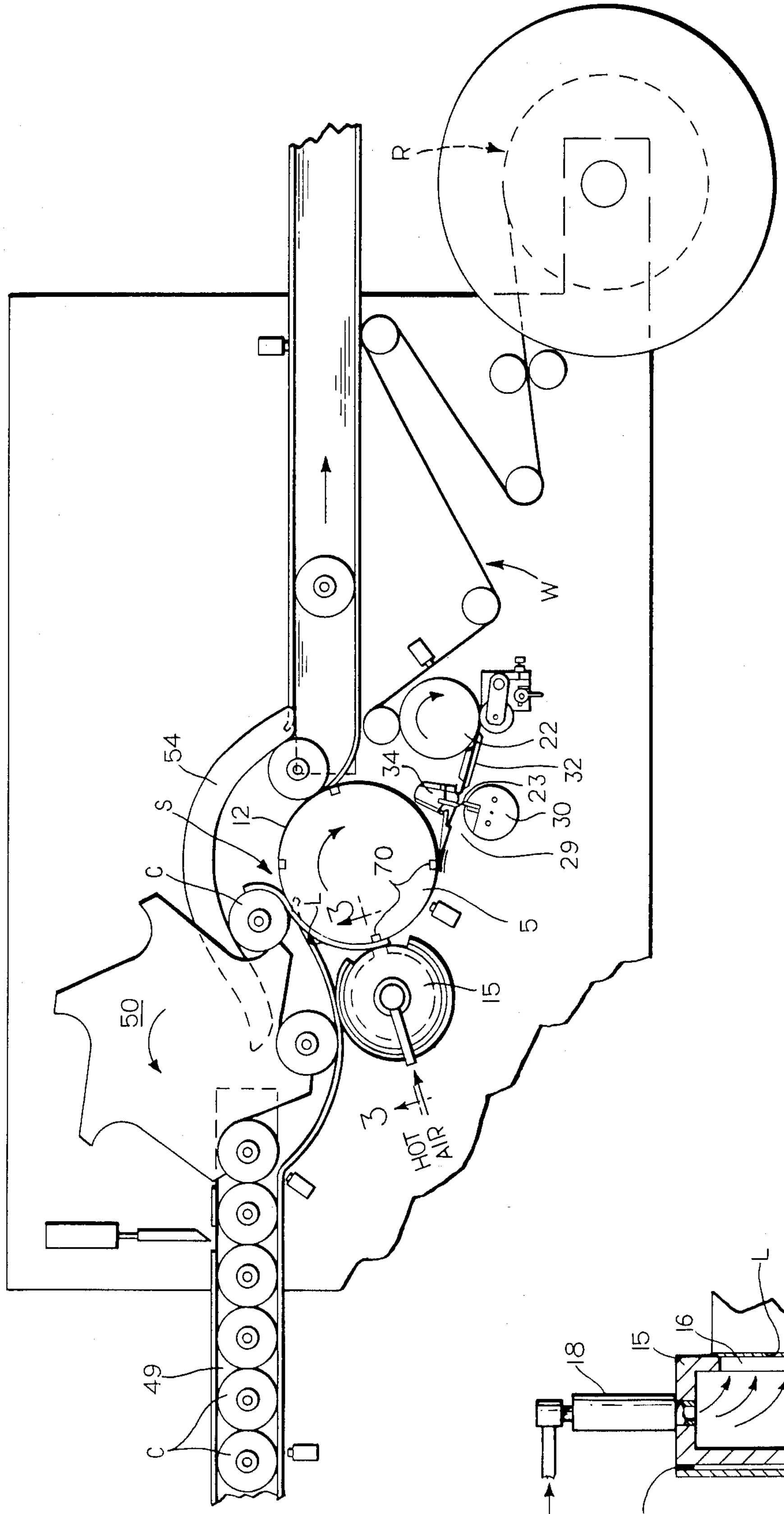
FIG. 1 is a fragmentary plan view showing the apparatus according to the present invention.

As is shown in FIG. 1, the apparatus according to the present invention incorporates a rotatable vacuum drum 5 which is rotatable about its vertical central axis in nearly tangential relationship with a container C at a label-wrapping station S. A flexible plastic label L, such as a label formed from a polystyrene foam/film laminate or co-extrudate, is partly disposed around a portion of the periphery 12 of the rotatable vacuum drum 5. A rotatable warm air distributor 15 applies warm air to preselected portions of the label L on the rotatable vacuum drum 5 just before the label L is wrapped around the container C at the label-wrapping station S. The warm air from the rotatable warm air distributor heats the selected portions of the label L to such a temperature that they become self-adhesive or tacky, in which state they self-adhere to the container C, or in the case of a label L which is of sufficient length to overlap itself on the container C, to permit the overlapped ends of the label L to adhere to one another.

Figure 2:
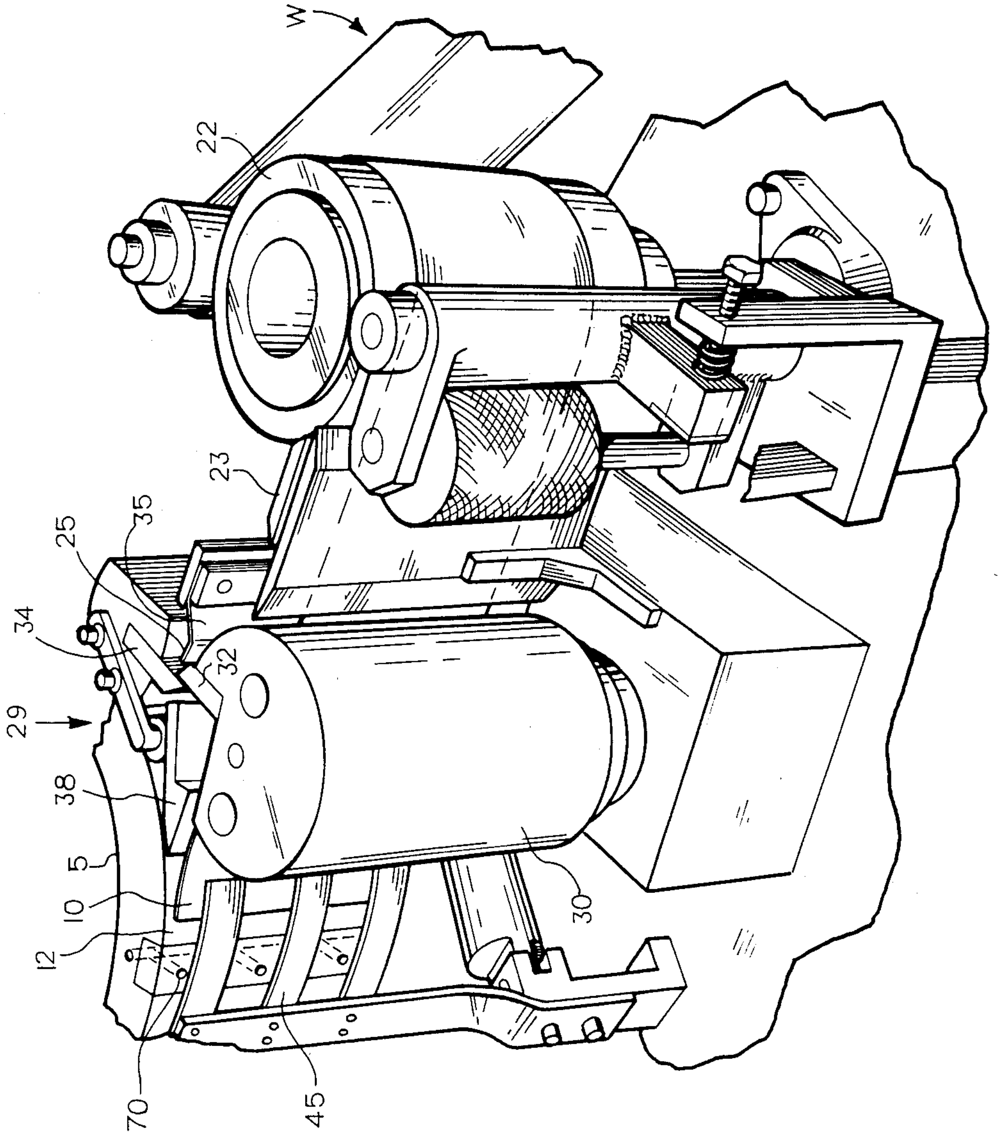
FIG. 2 is a fragmentary perspective view showing a portion of the apparatus of FIG. 1.

The plastic labels L are produced in succession, from a web W of such labels L, the web W being formed from an unwinding roll R of such labeled material. As is shown most clearly in FIG. 2, the web W is gradually advanced toward the rotatable vacuum drum 5 from the roll R by a driven feed roll 22 past a web guide 23 and a stationary directing bar 25 which is parallel to and adjacent the outer periphery of a rotating member 30. The web W is guided by the action of the directing bar 25 and a primary feed guide 35 on the outer side of the passing web. A secondary feed guide 38 guides the cut end of the web W towards the vacuum drum 5 and a final guide 45 guides the leading edge of the cut web W into contact with the vacuum drum 5. Individual labels L are formed from the web W at a severing station, indicated generally by reference numeral 29, by means of a knife 32 which is mounted on the periphery of the rotating member 30 and which severs the web W into a succession of labels L by virtue of the periodic engagement of the knife 32 with a fixed a knife 34. The leading edge of a label L emerging from the severing station 29 is engaged by vacuum in the rotatable vacuum drum which is applied to the label L through vacuum ports 70.

Figure 3:
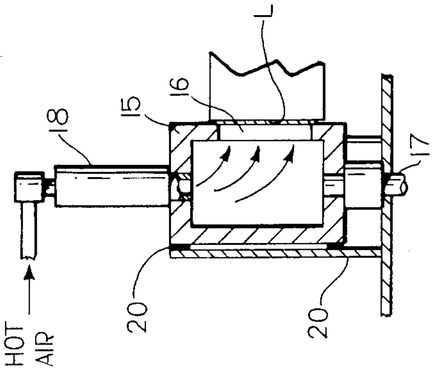
FIG. 3 is a sectional view taken on line 3—3 of FIG. 1.

As can be seen in FIG. 1, the containers C are successively transferred to the label-wrapping station S by transfer equipment that includes a conveyor 49 and a star wheel 50 which takes the containers C from the conveyor 49, and presents them in a proper, spaced apart relationship, along the radially interior side of a fixed arcuate surface 52, the movement of each container C along the fixed arcuate surface 52 resulting from rolling which causes each such container C to counterrotate with respect to the label L being applied thereto at the label-wrapping station S. As can be seen in FIG. 3, the rotatable warm air distributor 15 is in the shape of a substantially closed end cylinder, with a slot 16 in the outer periphery of the cylindrical portion thereof. The warm air distributor 15 is attached to a rotatable shaft 17, which is caused to rotate by means, not shown, for rotation of the rotatable warm air distributor 15 about its vertical central axis. Warm air, or other heated fluid, is supplied to the interior of the rotatable warm air distributor 15 by means of a conduit 18 from a source of supply, not shown, of such warm air. The warm air in the rotatable warm air distributor 15 passes therefrom through the slot 16, and the rotation of the rotatable warm air distributor 15 is synchronized with the rotation of the rotatable vacuum drum 5 so that warm air is applied against the leading edge and the trailing edge of each label L as it passes in the nip between the rotatable vacuum drum 5 and the rotatable warm air distributor, which are positioned to rotate in near contacting relationship with one another. A C-shaped baffle 19 partially surrounds the rotatable warm air distributor which rotates in sealed relationship with such C-shaped baffle 19, top and bottom seals 20 being provided between the rotatable warm air distributor 15 and the fixed C-shaped baffle 19 to divert the warm air away from the label L when the slot 16 is not aligned with a leading edge or a trailing edge of a label L passing between the rotatable warm air distributor 15 and the rotatable vacuum drum 5.

By virtue of the heat-softened condition of the leading edge portion of the label L, it is picked up by a container C as such container C rolls along the inside surface of the fixed arcuate surface 52, the vacuum forces tending to hold the label L against the rotatable vacuum drum 5 being discontinued before the leading edge of the label L contacts the container C. Continuation of the rolling of the container C along the inside surface of the fixed arcuate surface 52 will, therefore, completely strip the label L from the rotatable vacuum drum as the label L is progressively wound around the container C and the label L will be permanently adhered to the container C by virtue of the adhesion of the leading edge of the label L to the container C and the adhesion of the trailing edge of the label L to the container C or, in the case of a label whose length exceeds the circumference of the container C, to the overlapped leading edge of such label L.

Although the best mode contemplated by the inventor for carrying out the present invention as of the filing date hereof has been shown and described herein, it will be apparent to those skilled in the art that suitable modifications, variations, and equivalents may be made without departing from the scope of the invention. This invention, therefore, is intended to cover the subject matter of the claims appended hereto and the equivalents thereof.

What is claimed is:

1. Apparatus for sequentially wrapping flexible thermoplastic labels around containers, each of said containers having one of each of said flexible thermoplastic labels wrapped therearound by said apparatus, each of said containers having a generally cylindrical body portion, each of said flexible thermoplastic labels being wrapped around the cylindrical body portion of one of said containers by said apparatus, said apparatus comprising:

a rotatable vacuum drum;

means for rotating said rotatable vacuum drum;

means for providing a supply of said labels successively connected together in the form of a moving web from a coil of indefinite length;

severing means adjacent said rotatable vacuum drum for repeatedly severing said moving web to form a supply of said labels disconnected from one another;

means for sequentially advancing labels from said severing means to successively apply a leading edge of each of said labels against said rotating vacuum drum to be temporarily retained against said rotatable vacuum drum by virtue of the vacuum therein;

means for directing a heated fluid against said leading edge and against a trailing edge of each of said labels while said each of said labels is retained against said rotatable vacuum drum to soften at least a portion of said leading edge and at least a portion of said trailing edge to an adhesive state;

means for sequentially presenting a supply of said containers at a wrapping station; and means for sequentially transferring said labels from said rotatable vacuum drum to said body portions of said containers at said wrapping station while said at least a portion of said leading edge and said at least a portion of said trailing edge of each of said labels is still in said adhesive state, to effect sequential adhesion of said labels to said body portions of said containers.

2. Apparatus for sequentially wrapping flexible thermoplastic labels around containers, each of said containers having one of each of said flexible thermoplastic labels wrapped therearound by said apparatus, each of said containers having a generally cylindrical body portion, each of said flexible thermoplastic labels being wrapped around the cylindrical body portion of one of said containers by said apparatus, said apparatus comprising:

a rotatable vacuum drum;

means for rotating said rotatable vacuum drum;

means for providing a supply of said labels successively connected together in the form of a moving web from a coil of indefinite length;

severing means adjacent said rotatable vacuum drum for repeatedly severing said moving web to form a supply of said labels disconnected from one another;

means for sequentially advancing labels from said severing means to successively apply a leading edge of each of said labels against said rotating vacuum drum to be temporarily retained against said rotatable vacuum drum by virtue of the vacuum therein;

means for directing a heated fluid against said leading edge and against a trailing edge of each of said labels while said each of said labels is retained against said rotatable vacuum drum to soften at least a portion of said leading edge and at least a portion of said trailing edge to an adhesive state, said means for directing a heated fluid against said leading edge and against said trailing edge comprising;

a rotatable cylindrical distributor, said rotatable cylindrical distributor having slot means therein;

means for rotating said rotatable cylindrical distributor to expose said leading edge and said trailing edge to said slot means; and means for delivering heated fluid to the interior of said rotatable cylindrical distributor for passage therefrom through said slot means against said leading edge and said trailing edge;

means for sequentially presenting a supply of said containers at a wrapping station; and means for sequentially transferring said labels from said rotatable vacuum drum to said body portions of said containers at said wrapping station while said at least a portion of said leading edge and said at least a portion of said trailing edge of each of said labels is still in said adhesive state, to effect sequential adhesion of said labels to said body portions of said containers.

3. An apparatus according to claim 2 and further comprising:

a C-shaped baffle surrounding a portion of said rotatable cylindrical distributor, said C-shape baffle sealing said portion of said rotatable cylindrical distributor to substantially block the passage of said heated fluid through said slot means when said slot means is aligned with said C-shaped baffle.

4. A method for sequentially wrapping flexible thermoplastic labels around containers, each of said containers having one of each of said flexible thermoplastic labels wrapped therearound by said method, each of said containers having a generally cylindrical body portion, each of said flexible thermoplastic labels being wrapped around the cylindrical body portion of one of said containers by said method comprising the steps of:

providing a rotatable vacuum drum;

rotating said rotatable vacuum drum;

providing a supply of said labels successively connected together in the form of a coil of indefinite length;

unwinding said coil of indefinite length to form a moving web;

repeatedly severing said moving web at a location adjacent said rotatable vacuum drum to form a supply of said labels disconnected from one another;

successively applying a leading edge of each of said labels from said supply of said labels disconnected from one another to be temporarily retained against said rotatable vacuum drum for rotation therewith by virtue of the vacuum therein;

directing a heated fluid against said leading edge and against a trailing edge of each of said labels while said each of said labels is rotating with said rotatable vacuum drum to soften at least a portion of said leading edge and at least a portion of said trailing edge to an adhesive state;

sequentially presenting a supply of said containers at a wrapping station; and sequentially transferring said labels from said rotatable vacuum drum to said body portions of said containers at said wrapping station while said at least a portion of said leading edge and said at least a portion of said trailing edge of each of said labels is still in said adhesive state to effect sequential adhesion of said labels to said body portions of said containers.

5. A method for sequentially wrapping flexible thermoplastic labels around containers, each of said containers having one of each of said flexible thermoplastic labels wrapped therearound by said method, each of said containers having a generally cylindrical body portion, each of said flexible thermoplastic labels being wrapped around the cylindrical body portion of one of said containers by said method comprising the steps of:

providing a rotatable vacuum drum;

rotating said rotatable vacuum drum;

providing a supply of said labels successively connected together in the form of a coil of indefinite length;

unwinding said coil of indefinite length to form a moving web;

repeatedly severing said moving web at a location adjacent said rotatable vacuum drum to form a supply of said labels disconnected from one another;

successively applying a leading edge of each of said labels from said supply of said labels disconnected from one another to be temporarily retained against said rotatable vacuum drum for rotation therewith by virtue of the vacuum therein;

directing a heated fluid against said leading edge and against a trailing edge of each of said labels while each of said labels is rotating with said rotatable vacuum drum to soften at least a portion of said leading edge and at least a portion of said trailing edge to an adhesive state, the step of directing a heated fluid being accomplished by;

providing a rotatable cylindrical distributor having slot means therein;

rotating said rotatable cylindrical distributor to expose said leading edge and said trailing edge to said slot means; and delivering heated fluid to the interior of said rotatable cylindrical distributor for passage therefrom through said slot means against said leading edge and against said trailing edge;

sequentially presenting a supply of said containers at a wrapping station; and sequentially transferring said labels from said rotatable vacuum drum to said body portions of said containers at said wrapping station while said at least a portion of said leading edge and said at least a portion of said trailing edge of each of said labels is still in said adhesive state to effect sequential adhesion of said labels to said body portions of said containers.

6. The method according to claim 5 and further comprising the step of:

baffling said slot means of said rotatable cylindrical distributor when said slot means is not exposed to said leading edge and to said trailing edge of one of said labels to prevent the passage of said heated fluid through said slot means.

* * * * *